United States Patent [19]

Halm

[11] Patent Number: 4,860,023
[45] Date of Patent: Aug. 22, 1989

[54] PARABOLIC REFLECTOR ANTENNAS AND METHOD OF MAKING SAME

[75] Inventor: Rudolf Halm, Rijnsburg, Netherlands

[73] Assignee: European Space Agency/Agence Spatiale Europeenne, Paris, France

[21] Appl. No.: 46,216

[22] Filed: May 5, 1987

[30] Foreign Application Priority Data

May 6, 1986 [FR] France ............................... 86 06521

[51] Int. Cl.$^4$ ............................................. H01Q 19/12
[52] U.S. Cl. .................................................... 343/912
[58] Field of Search ............... 343/909, 912, 781, 756, 343/840; 29/600; 219/121 LH, 121 LJ

[56] References Cited

U.S. PATENT DOCUMENTS

| | | | |
|---|---|---|---|
| 3,549,733 | 12/1970 | Caddell | 219/121 LJ |
| 4,001,836 | 1/1977 | Archer et al. | 343/840 |
| 4,219,721 | 8/1980 | Kamen et al. | 219/121 LJ |
| 4,262,186 | 4/1981 | Provencher | 219/121 LH |
| 4,757,323 | 7/1988 | Duret et al. | 343/756 |

FOREIGN PATENT DOCUMENTS

| | | |
|---|---|---|
| 3029104 | 2/1982 | Fed. Rep. of Germany . |
| 2127567 | 4/1984 | United Kingdom . |
| 81/01079 | 4/1981 | World Int. Prop. O. . |

OTHER PUBLICATIONS

"New Grids for Improved Polarization Diplexing of Microwaves in Reflector Antennas", C. Dragon, *IEEE Transactions on Antennas and Propagation*; vol. AP-26, No. 3, pp. 459-463 (May 1978).
"Printing of Part Numbers using a High Power Laser Beam", G. Holzinger et al., *Optics and Laser Technology*, pp. 256-265 (Dec. 1973).
"The Current State of the Reflector Antenna Art", Willard V. T. Rusch, *IEEE Transactions on Antennas and Propagation*, vol. AP-32, No. 4, pp. 313-329 (Apr. 1984).

*Primary Examiner*—William L. Sikes
*Assistant Examiner*—Doris J. Johnson
*Attorney, Agent, or Firm*—Bell, Seltzer, Park & Gibson

[57] ABSTRACT

A method is provided for manufacturing a parabolic reflector antenna carried by a parabolic support made from an appropriate insulating material. The method of the invention includes in combination the following steps:

levelling out or smoothing the irregularities of the surface of said support by application of an appropriate levelling means, such as a lacquer or a polymer film or similar, total metallization of this surface thus levelled by metal deposition under a vacuum, forming of a mask or screen having orifices corresponding to the elements of the desired grid, interpositioning of this mask between an appropriate laser source and a focusing lens, focusing of the laser beam emitted by this source on the metallized surface of the reflector by following the contours of the orifices formed in the mask, scanning of the surface of the reflector by means of the laser beam for cutting out said grid therein, compensation of the variations of distance between the surface of the parabolic reflector and the laser source, and thus the focusing optics of the laser beam emitted thereby, during scanning of this surface.

3 Claims, 3 Drawing Sheets $L_1 = 0.2$ mm
$L_2 = 6.35$ mm
$L_3 = 0.127$ mm
$L_4 = 4.6$ mm

PARABOLIC REFLECTOR ANTENNAS AND METHOD OF MAKING SAME

BACKGROUND OF THE INVENTION

1. Field of the Invention

The present invention relates to antennas and more particularly to antennas of the type called parabolic reflector antennas intended to be used on board a telecommunications satellite, and a method for manufacturing these antennas.

Technicians skilled in this matter know that, in the field of satellite links, several types of antennas may be used, particularly:

approximately isotropic antennas which require no particular orientation of the satellite, but which waste the transmitting power, dipoles, whose antenna pattern has a maximum in the plane perpendicular to its axis, which plane must be oriented towards the Earth by stabilizing the satellite by rotation about an axis parallel to the dipole, horn antennas with overall coverage, whose antenna pattern coincides with a cone having a flare angle of 17°, but which must remain pointed towards the Earth, and parabolic reflector antennas covering a zone limited to a Continent or a region, even a country, and whose gain increases inversely with the flare angle of the beam.

2. Description of the Prior Art

Now, among the parabolic reflector antennas, the two following types are used, antennas (or reflectors) with a surface sensitive to the polarization and antennas (or reflectors) with a surface sensitive to the frequency, (known as "polarization-sensitive surfaces", PSS and "frequency-sensitive surfaces" FSS, respectively: see the Antenna Engineering Handbook by Johnson/Jasik-Mc Graw Hill). In so far as polarization sensitive reflectors are concerned, they are used on board telecommunications satellites for providing frequency re-use in the case of double linear polarization.

The surface sensitive to the polarization of the signals is formed by a plurality of parallel linear reflectors, consisting of aluminum, copper or other metal strips, and defining a grid g on the surface of the reflector (also grid reflector: cf. also the reference Rp in FIG. 1a accompanying the present description), which linear reflectors reflect a polarization and transmit the perpendicular polarization.

The support structure for said grid is formed by a honeycomb core n sandwiched between two "Kevlar" sheets Kv1, and Kv2 (cf. FIG. 1b).

In so far as the frequency sensitive reflectors are concerned, they are used for the simultaneous generation of different beams in more than one frequency band using the same antenna (in other words, these reflectors transmit the signals of one frequency band and reflect the signals of another frequency band).

The surface sensitive to the frequency of the signals (or dichroic surface) is formed by a plurality of separate resonating elements, but disposed side by side and defining on the surface of the reflectors a double grid (we speak of double grid reflector) of resonating elements which are required for separating frequencies whose ratio is between 1.5/1 and 2/1. Different types of elements are used, such as rings, (cf. FIG. 2a), crossed dipoles (cf. FIG. 2b), square loops (cf. FIG. 2c), Jerusalem crosses (cf. FIG. 2d) and tripoles (not shown, but each defined by a star with three arms separated by 120° from each other). The mechanical constraints and those due to the environment mean that the double grid resonating elements must be embedded in laminated dielectric structures of the honeycomb type made from "Kevlar" (cf. FIG. 5).

Now, the construction of said polarization and frequency sensitive surfaces is very delicate. In fact:

in so far as the spacing between the axes of the two adjacent metal strips of the PSS reflectors and the width of these strips are concerned, these parameters must be optimized for minimizing the insertion losses and maximizing the suppression of cross polarization: for example, for the frequency of 12 GHz, the width of the metal strips and the spacing between the axes of two adjacent strips are of the order of 0.1 mm and 0.25 mm, respectively; furthermore, the thickness of the metal strips must be kept at a minimum value for reducing the thermal distortion of the reflectors due to the different thermal expansion coefficients of the laminated support structure and of the grid, in so far as the dimensioning of the resonating elements of an FSS (or dichroic) reflector are concerned, this is critical for optimizing the electric behavior: for example, elements must be formed whose width is about 25 mm, which is very delicate; moreover, it is also necessary in this case to make the thickness of the metal resonating elements minimum, so as to reduce the thermal distortion.

The critical aspect of the dimensioning of the dichroic reflectors also exists in connection with a particular category of this type of reflector, which is represented by the thermal shields transparent to radio frequencies. These shields are intended to reflect the infrared radiation and to filter as much as possible the solar rays so as to limit the temperature rise. They are formed from a "Kapton" dielectric support coated with aluminum on the inner side, the aluminum coating being etched in accordance with the pattern providing efficient transparency to the radiofrequencies. Now, so that the transmission losses are very small, it is vital for the dielectric support and the metal elements etched thereon to have, respectively, the smallest possible thickness and dimensions: a typical value for the square elements (see FIG. 3) is 90 μ for the corresponding side, with about 7 μm between two adjacent elements.

In so far as the techniques are concerned for manufacturing PSS reflectors, the four methods mentioned below are used for applying the above mentioned metal grid to the "Kevlar" sheet of a reflector of this type:

First method

Coating the surface with a film which serves as mask and in which the structure of the grid has been previously cut out, Vacuum deposition of an appropriate metal in the vapor state, Removal of the mask so as to leave the metallized strips in position;

Second method

Application of a metal grid using a photochemical method on the adhesive ribbon strips made from "Kapton"; in this case, the arrangement of these strips, thus metallized, in parallel strips on a parabolic surface is obtained by cutting the ribbon up into small pieces which are then stuck together;

Third method said grid to be disposed on a parabolic surface is obtained by developing this latter on a flat sheet and cutting it out from this sheet: it should be noted that on this sheet said strips—which are parallel in the parabolic surface—are no longer parallel to each other (cf. FIG. 4, as well as the patent US-4 001 836). The grid thus developed is transferred by a photochemical method to an adhesive strip made from "Kapton". Then, this adhesive strip is bonded in sections on the surface of the reflector so as to form the grid or parallel elements typical of PSS reflectors;

Fourth method incorporation of metal wires forming the desired grid in a laminated structure.

However, all these methods are time consuming due to complying with manufacturing tolerances, both from the mechanical and the electrical points of view. Furthermore, bonding the grid in the form of a prefabricated ribbon adds to these problems the one of stability of the junction lines in an environment as severe as the space environment and, consequently, those of increasing the insertion losses and of degradation of the performance of the antenna.

The typical drawbacks of the four above mentioned methods are the following:

in so far as the first method is concerned, cutting out the mask limits the configuration which can be given to the grid, and in particular the optimization of the spacing between the axes of the strips and the width of these latter which is required for adaptation to higher frequencies, in so far as the second and third methods are concerned, bonding the adjacent strips to a non-flat surface is critical for keeping the ohmic losses to low values, which involves the use of optical alignment control means which are very time consuming.

In so far as the fourth method is concerned, it does not satisfy the requirement of good electric performance because of the lower limits existing for the diameter of the metal wires and the dimensional parameters of the grid.

As for the technique for manufacturing FSS reflectors, it should be stated that it consists in disposing two layers of "Kapton" Kp1 and Kp2—in which metal (dichroic) dipoles D have been previously embedded—between "Kevlar" layers Kv and honeycomb layers (cf. FIGS. 5a and 5b).

However, since the thermal expansion coefficient of metallized layers differs greatly with respect to that of the "Kapton" substrate, a relatively thick adhesive layer must be used, which adds to the problem of manufacturing tolerances, as mentioned above, the problem of stability of the composite structure.

Furthermore, in so far as the manufacture of said thermal screens transparent to radio frequencies is concerned, the metal squares, illustrated in FIG. 3, on a "Kapton" sheet Kp are at present obtained by photoetching.

However, the limitations inherent in present photoetching methods prevent the construction of one piece thermoscreens of large dimensions, which means that they must be manufactured by assembling component elements of small dimension and, consequently, by increasing manufacturing time and costs.

The patent FR-2 152 671 describes a method of producing a dielectric material layer charged with an electroconducting material, particularly for covering radomes, in which the latter is deposited on the former in an appropriate configuration defining identical zones of electroconducting material. This configuration is obtained either by selectively etching an electroconducting material layer applied to the dielectric surface or by applying to this latter a screen having apertures whose contours define a zone corresponding to said electroconducting zones, and by applying the electroconducting material through these apertures. However, apart from the use of a screen of said type, the method described in patent FR-2 152 671 has nothing to do with the method of the invention.

The purpose of the present invention is to provide a method of manufacturing a parabolic reflector antenna, in particular of the type having a polarization sensitive surface (PSS) or frequency sensitive surface (FSS), which method answers better the requirements of practice than previously known methods aimed at obtaining the same results, particularly in that the manufacturing tolerances obtained ensure optimum performances for the reflectors thus produced, and in that the manufacturing time is considerably reduced.

SUMMARY OF THE INVENTION

The present invention provides a method of manufacturing a gridded parabolic reflector antenna intended to be used on board a telecommunications satellite, having a polarization (PSS) or frequency (FSS) sensitive surface and carried by a support made from an appropriate insulating material, this surface being defined by a metal grid having elements of appropriate configuration, which method is characterized in that it includes in combination the following steps:

levelling out or smoothing the irregularities of the surface of said support by application of an appropriate levelling means, such as a lacquer or a polymer film or similar, total metallization of this surface thus levelled, by metal deposition under a vacuum, forming of a mask (or screen) having orifices corresponding to the elements of the desired grid, interpositioning of this mask between an appropriate laser source and a focusing lens, focusing of the laser beam emitted by this source on the metallized surface of the reflector while following the contours of the orifices formed in the mask, scanning of the surface of the reflector by means of the laser beam for cutting out said grid therein, compensation of the variations of distance between the surface of the parabolic reflector and the laser source, and thus the focusing optics of the laser beam emitted thereby, during scanning of this surface.

Apart from the above arrangements, the invention includes further arrangements which will be clear from the following description.

BRIEF DESCRIPTION OF THE DRAWINGS

The invention will be better understood from the complement of description which follows, with reference to the accompanying drawings in which:

FIGS. 1 to 5 refer to the prior art and in particular:

FIGS. 1a and 1b illustrate a parabolic reflector with polarization sensitive surface (PSS), FIG. 1a being a top view whereas FIG. 1b is a sectional view, FIG. 3 illustrates the configuration of the elements defining the surface of a particular type of FSS reflector, namely having a thermal shield transparent to radiofrequencies, FIG. 4 illustrates the surface of a PSS reflector developed in a plane.

It should however be understood that these drawings and the corresponding descriptive parts are given only by way of illustration of the object of the invention, of which they form in no way a limitation.

DESCRIPTION OF THE PREFERRED EMBODIMENT

Figure 6:
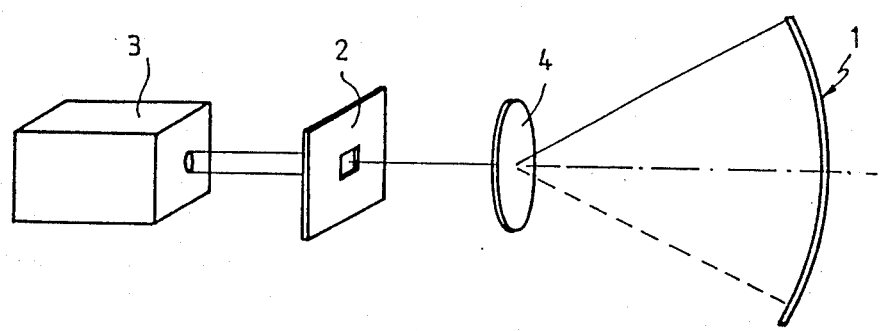
FIG. 6 illustrates schematically the method of forming the surface of a parabolic (PSS or FSS) reflector, in particular with a thermal shield.

FIGS. 1 to 5 have been described in connection with the description of the prior art, so that the following description will be limited essentially to FIG. 6, which will be used for describing the method of the invention for obtaining the above defined PSS or FSS parabolic reflector antennas, intended to equip telecommunications satellites. The polarization (PSS) sensitive or frequency (FSS) selective surfaces are supported by an insulating support formed by a paraboloid portion, whose construction is well known to technicians in the matter.

As regards the construction of the PSS or FSS surfaces, the applicant proposes the advantageous application of a method capable of bringing a solution to the problems presented by existing methods and described above, particularly in so far as the manufacturing time and tolerances and so the practical performances of this type of antennae are concerned.

The method of the invention includes in combination the following steps:

First Step

This relates to the prior preparation of the surface of said insulating Kevlar support of reflector 1. In fact, the state of this surface is not strictly smooth, which requires the application of an agent for levelling out the inevitable unevenesses of the surface of the support. For this, there may be advantageously used:

either a lacquer, for example "Tedlor" 50AM20LH "Drabit" 60125, "Cuvertin" 001, etc.,
or a resin,
or a polymer film.

Feasibility tests have shown the critical character of this step, which must be carried out very carefully.

Second Step

The second step of the method consists in completely metallizing the surface of said insulating support, levelled during the first step. This metallization is carried out by vacuum deposition of an appropriate metal vapor, such as aluminum or copper.

Third Step

This step consists in mounting the reflector 1 first of all on an optical bench (not shown in FIG. 6) and in preparing a mask 2 in which are reproduced openings whose contour corresponds to that of the elements of the grid defining the surface of the PSS or FSS reflector 1. This mask is interposed between an appropriate laser source 3 (chosen, for example, from argon or Nd87ag or else $CO_2$ sources, which generate laser beams whose wave length varies between 0.5 and 10.6 $\mu$) and a lens 4 for focusing the laser beam generated by source 3.

Then, this beam is focused on the surface of the parabolic reflector 1, following the contours defined by mask 2 and thus cutting out with the laser the metallized surface of reflector 1. By adjusting the devices for focusing the laser beam, the thickness of this beam and so the cutting width can be adjusted. In so far as the construction of a PSS grid is concerned, (cf. FIG. 1a), it is obtained by scanning the surface of the reflector through parallel movements of the optical equipment of this reflector.

Figure 1A:
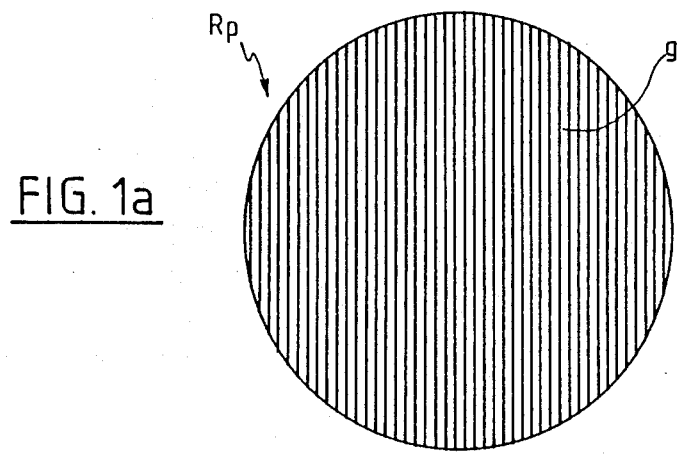
Figure 1B:
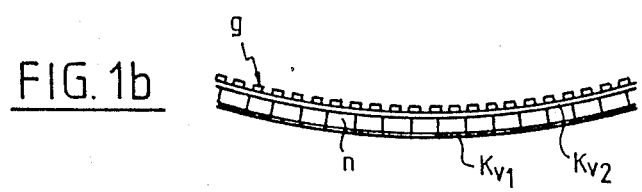
Figure 2A:
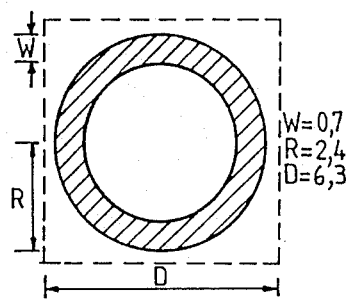
FIGS. 2a to 2d illustrate the different configurations of the elements defining the surface of a frequency sensitive parabolic reflector (FSS) or dichroic reflector.
Figure 2B:
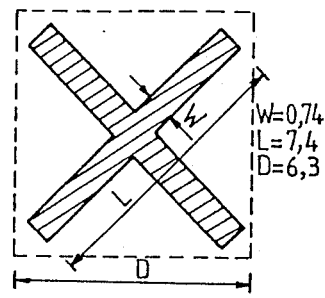
Figure 2C:
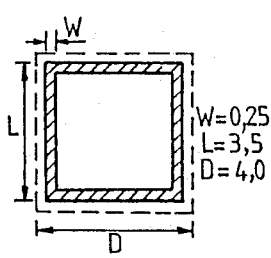
Figure 2D:
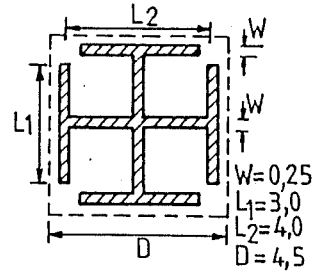
Figure 3:
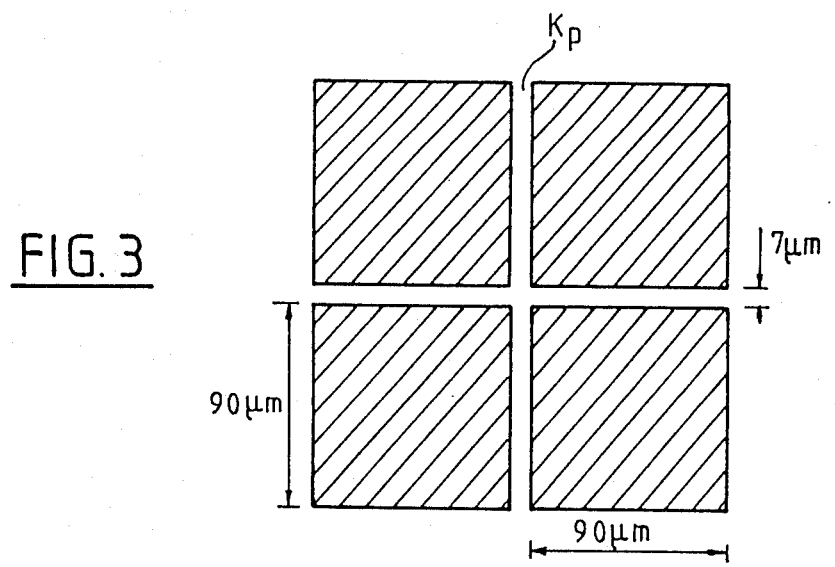
Figure 4:
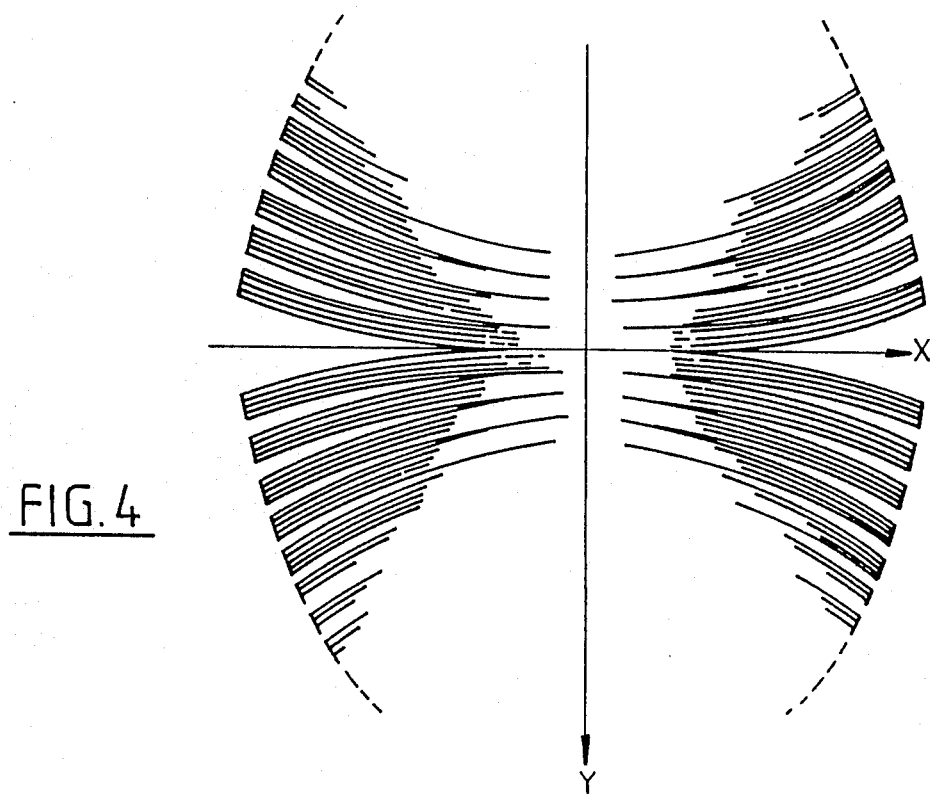
Figure 5A:
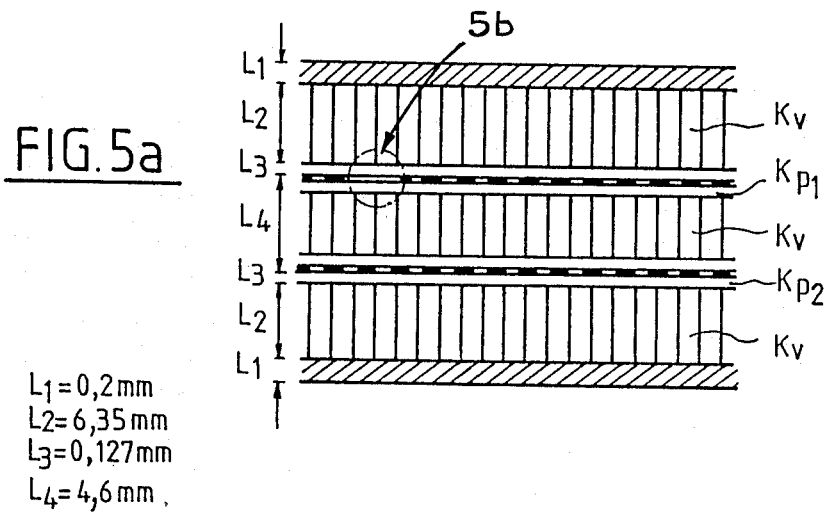
FIGS. 5a and 5b illustrate the structure of an FSS (or dichroic) reflector.
Figure 5B:

It goes without saying that the construction of an FSS grid using any one of the elementary configurations of FIG. 2, differs from the construction of a PSS grid, in so far as the mask is concerned; similarly, by using a mask corresponding to the configuration illustrated in FIG. 3, the surface of a thermal screen transparent to radiofrequencies can be cut out with the laser.

In each case, the configuration of the elements formed in the mask may be reduced, by means of the focusing optics, to the scale corresponding to the desired dimensions.

Furthermore, the variations in distance which occur during scanning of this surface because of the parabolic profile of the reflector between the laser source (and thus the focusing optics) and the surface of the reflector may be compensated for, for cutting out in this latter the grid corresponding to the type of reflector desired. The depth of cutting out with the laser may be optimized by controlling the parameters of the laser, as well as the rate of scanning of the surface of the reflector. By way of indication, the wave width of the laser should be chosen so as to correspond to 1/10 of the desired cutting width.

By way of non limitative example, it should be mentioned that application of the method of the invention, particularly in so far as the construction, of PSS reflectors is concerned, allows metal strips to be obtained whose minimum width is the order of 50 $\mu \pm 10\%$.

This result is compared below with the results obtained in particular by applying the first and second methods of the prior art mentioned in the part of this description dealing with the state of the art; in these two cases, the minimum width of a strip is, respectively:

0.4 mm$\pm 10\%$, in so far as the first method is concerned, and 0.1 mm$\pm 10\%$, in so far as the second method is concerned; however, after bonding to the parabolic support surface, the performances of the reflector obtained are degraded because of the inaccuracies in the relative alignment of the contiguous strips bonded at the side of each other.

In so far as the third method of the prior art is concerned (described following the first and second above mentioned methods), it should be noted that it gives rise to very high thermal distortion and therefore has no real practical interest.

It has not been possible to make a comparison with the fourth method of the prior art because the applicant has no comparative data in this connection. This being so, it may be emphasised, still by way of non limitative example, that the minimum spacing which may be obtained between two contiguous strips of a PSS reflector, using the method of the invention, is 10 $\mu \pm 10\%$ (this spacing should not be confused with the spacing between the axes of two contiguous strips, whose minimum value—within the scope of the present invention—may be derived from the two above mentioned minimum values, relative to a PSS reflector of the invention.).

With the method of the invention, antennas can therefore be obtained, and more particularly antennas of the so called parabolic reflector type, and more particularly PSS or FSS reflectors, which have manufacturing tolerances and consequently performances which have never been obtained up to the present time within the knowledge of the applicant.

Anyway, it should be stressed that direct evaporation of metal from the reflector surface by means of laser heating may lead to manufacturing problems, which are briefly summarized below:

various metals (e.g. aluminum, copper, ...) show a critical behaviour concerning the plasma stability during the evaporation. In order to obtain efficient coupling of the laser energy to the surface, the formation of a plasma is required which acts as a photon absorber and transfers the energy to the surface. However, depending on the reflectivity of the surface, a rapid plasma breakdown may occur even at laser intensities just sufficient for plasma formation. This breakdown is accompanied by a shock wave which can lead to surface damage (interruptions of the produced metal stripes, rugged edges and damage of the plastic substrate). This effect can dramatically reduce the spatial quality of the produced patterns, due to the high temperatures required for the evaporation of the metal layer, extensive heating of the substrate material must be expected under certain conditions (especially due to the high thermal conductivity of metals). Evaporation and decomposition of the plastic substrate may lead to explosive eruptions causing severe damage to the non-ablated portions of the metal coating and to the substrate itself.

An alternative to circumvent the above mentioned problems which can occur under certain conditions with direct laser evaporation, is the use of a laser chemical etching method. This method is described briefly below.

The desorption of metals from the substrate surface can be strongly enhanced, if the metal can be chemically transformed into a compound which is more volatile than the parent metal (that means, which has a higher vapour pressure). As a chemical reactant, a substance—either a gas or a liquid—can be used which exhibits a high reaction rate in the presence of the laser light and which only slow or none dark reaction.

The desorption mechanism can be divided into two parts: the laser enhancement of the chemical reaction and the desorption of the reaction products by laser evaporation.

For the reaction enhancement there exist different schemes:
dissociation of an initially non-reactive parent substance to form highly reactive radicals,
dissociation of an initially less reactive parent substance to form free radicals,
reaction enhancement by electronic or vibrational excitation of the reactant molecule.

The reaction is furthermore supported by the desorption of the reaction products by laser evaporation. It has to be noticed that this desorption process can take place at considerably lower temperature than would be required for direct evaporation of the metal. The simultaneous removal of reaction products allows structured patterning by use of laser light even if the chemical system shows appreciable dark reaction as long as the reaction products itself form a reaction barrier.

In order to reduce the substrate temperature during processing, the chemical reaction pathway can be optimized to preferably yield the most volatile of the possible reaction products. This can be achieved by using homogeneous catalysts.

As regards the manufacturing of the required microwave structures, the laser beam—together with the reactant substance—has to be applied to the surface. As a reactant, a gas seems most appropriate to the manufacturing of the antenna. The handling of the laser beam is in principle identical to that for direct evaporation described above. That means the laser light can be applied to the surface by either directly focusing or by imaging of a proper mask and using a step-and-repeat procedure.

Unlike direct evaporation, a reactant gas is applied to the surface. The process is either run in a containment for the whole antenna or the reactant gas can be sprayed onto the surface in a localized area around the laser beam. In the latter case, it is necessary that the etching process exhibits sufficient etching rates at atmospheric pressure and that redeposition processes due to slow diffusion of the reaction products off the surface is not significant. In the case that diffusion shows to be the limiting process, etching rates can be enhanced by applying the etchant gas in a gas jet and removing the reaction products by a pump. In this case a small local containment is used. With such a containment, also hazardous chemicals can be used, thus giving a wider spectrum of applications. However, non-toxic reactants, like freons, are preferred for etching at atmospheric pressure wherever possible.

As is clear from the foregoing, the invention is in no way limited to those of its modes of application and embodiments which have been described more explicitly; it embraces, on the contrary, all variants thereof which may occur to a technician skilled in the matter, without departing from the scope or spirit of the present invention.

What is claimed is:

1. A method of manufacturing gridded parabolic reflector antennas of the type having a polarization (PSS) or frequency (FSS) sensitive surface and supported by an insulating material, this surface being defined by a metal grid consisting of elements pertaining to either a PSS or FSS type reflector, which method includes in combination the following steps:
   levelling the irregularities of the surface of said support by applying a levelling means, such as a lacquer or a polymer film,
   metallizing substantially the entire levelled surface by metal deposition under a vacuum,
   forming a mask having orifices corresponding to the elements of the desired grid,
   interpositioning the mask between a laser source and a focusing lens,
   focusing the laser beam emitted by this source on the metallized surface of the reflector, while following the contours of the orifices formed in the mask,
   scanning the surface of the reflector by means of the laser beam for cutting out said grid therein, and
   maintaining the distances between each of the laser source, the focusing lens, the mask and the surface of the parabolic reflector substantially constant during scanning of the surface.

2. Parabolic reflector antenna having a polarization sensitive surface obtained using the method as claimed in claim 1.

3. A parabolic reflector antenna having a frequency sensitive surface obtained using the method as claimed in claim 1.

* * * * *